Patented Nov. 29, 1938

2,138,733

UNITED STATES PATENT OFFICE 2,138,733

ANTICRYPTOGAMIC COMPOSITION

Albert D'Amico, Rome, Italy

No Drawing. Application February 5, 1937, Serial No. 124,328. In Italy February 20, 1936

1 Claim. (Cl. 167—16)

My present invention has for its object to forestall and fight mildew of wheat and cereals generally, as well as cryptogamic parasites of plants and their products.

From old times the baleful destructive action of mildew on grains and cereals generally is known in agriculture, as well as the serious damage inflicted by cryptogams to plants.

Mildew, especially, is easily recognized by its rusty colour to which the name of "rust" of this malady is due.

No efficient remedy of this malady has hitherto been known, as every means devised for fighting it, besides being inefficient, presented difficulties in actual practice, leaving alone the high cost which made the process anti-economical.

My present invention is essentially based on the use of a combination of finely powdered calcium oxide with powdered anhydrous copper sulphate. Both anhydrous copper sulphate and calcium oxide are well known and powerful absorbents of moisture and when applied to the plants in their dry, powdered form, moisture from the air and that from the surface of the plant, is taken up.

The calcium oxide it is well known thereby becomes calcium hydroxide and adheres to the plant, and because of its great preponderance in the mixture prevents for a while a great absorption of moisture by the copper sulfate.

There are at least four reactions which the mixture of these substances undergo or cause, which give them increased cryptogamic effect, namely:

1. The calcium oxide dries the surface of the plant and this removal of moisture, which is essential to the development of the cryptogams, prevents their development.

2. The excess of calcium oxide maintains the copper sulfate in the anhydrous condition until a large part of the oxide has changed into hydroxide and carbonate.

3. When the calcium oxide changes to hydroxide this absorbs carbon dioxide from the air, and this forms a somewhat rigid coating upon the plant, and thus largely prevents the powder from falling, or in case of rain, being washed off the plant.

4. Any beginning growth of a cryptogamic organism comes into contact with these two substances, which, because of its tender tissues absorb its water and, the copper sulfate being thereby rendered soluble, is in turn absorbed by the cryptogam and poisons it.

This composition in being hydrated in the above way forms a powerful anticryptogamic by attacking the cryptogams just in the moment of their highest virulence, i. e. when the climatological elements most especially favour their development.

Satisfactory proportions, for instance, are 2–3 kg. of anhydrous copper sulphate in 100 kg. of finely powdered calcium oxide (quicklime) thoroughly mixed together so as to be quite homogeneous.

It is easily used by being spread on the plants mechanically or manually.

I claim:

An anticryptogamic composition for plants which consists of a homogeneous mixture of calcium oxide and completely dehydrated copper sulfate, both in finely powdered condition.

ALBERT D'AMICO.